United States Patent
Iwase

(10) Patent No.: US 10,754,305 B2
(45) Date of Patent: Aug. 25, 2020

(54) CONTROLLER FOR PARALLEL LINK MECHANISM

(71) Applicant: Mitsubishi Electric Corporation, Chiyoda-ku (JP)

(72) Inventor: Masaoki Iwase, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 62 days.

(21) Appl. No.: 16/307,713

(22) PCT Filed: Apr. 18, 2017

(86) PCT No.: PCT/JP2017/015580
§ 371 (c)(1),
(2) Date: Dec. 6, 2018

(87) PCT Pub. No.: WO2018/029910
PCT Pub. Date: Feb. 15, 2018

(65) Prior Publication Data
US 2019/0384233 A1    Dec. 19, 2019

(30) Foreign Application Priority Data

Aug. 8, 2016    (JP) ................................ 2016-155813

(51) Int. Cl.
*G05B 11/36* (2006.01)
*B25J 9/16* (2006.01)
*B25J 19/02* (2006.01)

(52) U.S. Cl.
CPC ............. *G05B 11/36* (2013.01); *B25J 9/1694* (2013.01); *B25J 19/02* (2013.01); *G05B 2219/41006* (2013.01)

(58) Field of Classification Search
CPC ........... G05B 11/36; G05B 2219/41006; B25J 9/1694; B25J 19/02; B25J 11/00
See application file for complete search history.

(56) References Cited

U.S. PATENT DOCUMENTS 6,786,896 B1 * 9/2004 Madhani ................ B25J 9/1615
606/1
7,129,665 B2  10/2006 Ando
(Continued)

FOREIGN PATENT DOCUMENTS

JP     11-277469 A   10/1999
JP     2002-91568 A   3/2002
(Continued)

OTHER PUBLICATIONS

English search report and Written opinion for PCT/JP2017/015580 (Japanese copy submitted with applicants IDS dated Dec. 6, 2018) (Year: 2017).*

(Continued)

*Primary Examiner* — Michael D Masinick
(74) *Attorney, Agent, or Firm* — Xsensus LLP

(57) ABSTRACT

A controller for a parallel link mechanism includes a drive control unit that controls driving of a parallel link mechanism and a command section that gives a command for controlling an actuator to the drive control unit. The command section includes a natural frequency prediction unit that calculates a predicted value string of a natural frequency changing depending on the position of an end effector for each interpolation position of the end effector by using a dynamic model that simulates a mechanical system from a base to a link joint of the parallel link mechanism with a translational spring and simulates a mechanical system from the link joint to the end effector with one rigid body. The drive control unit includes a filter that changes a frequency component to be suppressed for each interpolation positions according to a predicted value string at each interpolation position of the end effector.

9 Claims, 6 Drawing Sheets

(56) References Cited

U.S. PATENT DOCUMENTS

| | | | | |
|---|---|---|---|---|
| 8,079,800 | B2* | 12/2011 | Tanaka | B66C 1/0256 |
| | | | | 414/744.5 |
| 8,906,002 | B2* | 12/2014 | Kishi | A61B 34/70 |
| | | | | 606/1 |
| 9,343,341 | B2* | 5/2016 | Hashimoto | H01L 21/67742 |
| 9,610,686 | B2* | 4/2017 | Song | B25J 9/046 |
| 2013/0192420 | A1* | 8/2013 | Isobe | B25J 11/00 |
| | | | | 74/99 R |
| 2014/0060234 | A1* | 3/2014 | Uemura | B25J 11/00 |
| | | | | 74/490.05 |
| 2017/0348855 | A1* | 12/2017 | Abe | B25J 9/1664 |
| 2019/0111561 | A1* | 4/2019 | Isobe | B25J 19/0083 |

FOREIGN PATENT DOCUMENTS

| | | | |
|---|---|---|---|
| JP | 2005-196488 A | | 7/2005 |
| JP | 2008096384 A | * | 4/2008 |

OTHER PUBLICATIONS

Hogue, Md Emdadul, et al. "A three-axis vibration isolation system using modified zero-power controller with parallel mechanism technique." Mechatronics 21.6 (2011): 1055-1062. (Year: 2011).*

Kang, Bongsoo, and James K. Mills. "Vibration control of a planar parallel manipulator using piezoelectric actuators." Journal of Intelligent and Robotic Systems 42.1 (2005): 51-70. (Year: 2005).*

International Search Report dated Jul. 25, 2017, in PCT/JP2017/015580, filed Apr. 18, 2017.

* cited by examiner

CONTROLLER FOR PARALLEL LINK MECHANISM

FIELD

The present invention relates to a controller for a parallel link mechanism in which a plurality of links are connected in parallel by joints.

BACKGROUND

In a parallel link mechanism, a plurality of links are connected in parallel by joints between a base and an end effector. Some or all of the links are driven by an actuator to drive and control the end effector to an arbitrary position or attitude.

Patent Literature 1 has found that, when the end effector is in an attitude away from the point of origin, the rigidity of the parallel link mechanism is reduced to cause vibration at the time the mechanism is driven.

In response to the above finding, a controller described in Patent Literature 1 suppresses the vibration by changing the values of parameters of a control system (hereinafter referred to as "control parameters") such that responsiveness of an actuator is reduced as the mechanical rigidity is reduced and as the feed speed of the actuator is increased.

CITATION LIST

Patent Literature

Patent Literature 1: Japanese Patent Application Laid-open No. 2005-196488

SUMMARY

Technical Problem

However, the method of Patent Literature 1 needs to adjust upper and lower limit values of the control parameters related to responsiveness such as a proportional gain, an integral gain, a derivative gain, an integral time, a derivative time, and a time constant as well as adjust conditions for changing the control parameters. The control parameters related to responsiveness need to be adjusted not only at the time of starting up the system but every time the end effector is changed, so that man-hours for the adjustment of the control parameters related to responsiveness are increased with the method of Patent Literature 1.

The present invention has been made in view of the above, and an object of the invention is to obtain a controller for a parallel link mechanism capable of suppressing vibration that may occur in a parallel link mechanism while reducing man-hours for the adjustment of control parameters related to responsiveness.

Solution to Problem

In order to solve the above problem and achieve the object, a controller for a parallel link mechanism according to the present invention includes a drive control unit that controls an actuator for driving a parallel link mechanism, and a command section that gives a control command for the actuator to the drive control unit. The command section includes a natural frequency prediction unit that calculates a predicted value string of a natural frequency of the parallel link mechanism calculated for each interpolation position of an end effector by using a dynamic model that simulates a mechanical system between a base and a link joint of the parallel link mechanism with a translational spring and simulates a mechanical system from the link joint to the end effector with one rigid body. The drive control unit further includes a filter that changes a frequency component to be suppressed for each interpolation positions according to the predicted value string at each interpolation position of the end effector calculated by the natural frequency prediction unit.

Advantageous Effects of Invention

The present invention can suppress vibration that can occur in the parallel link mechanism while reducing the man-hours for the adjustment of the control parameters related to responsiveness.

DESCRIPTION OF EMBODIMENTS

A controller for a parallel link mechanism according to embodiments of the present invention will now be described in detail with reference to the drawings. Note that the present invention is not limited to the following embodiments.

First Embodiment.

Figure 1:
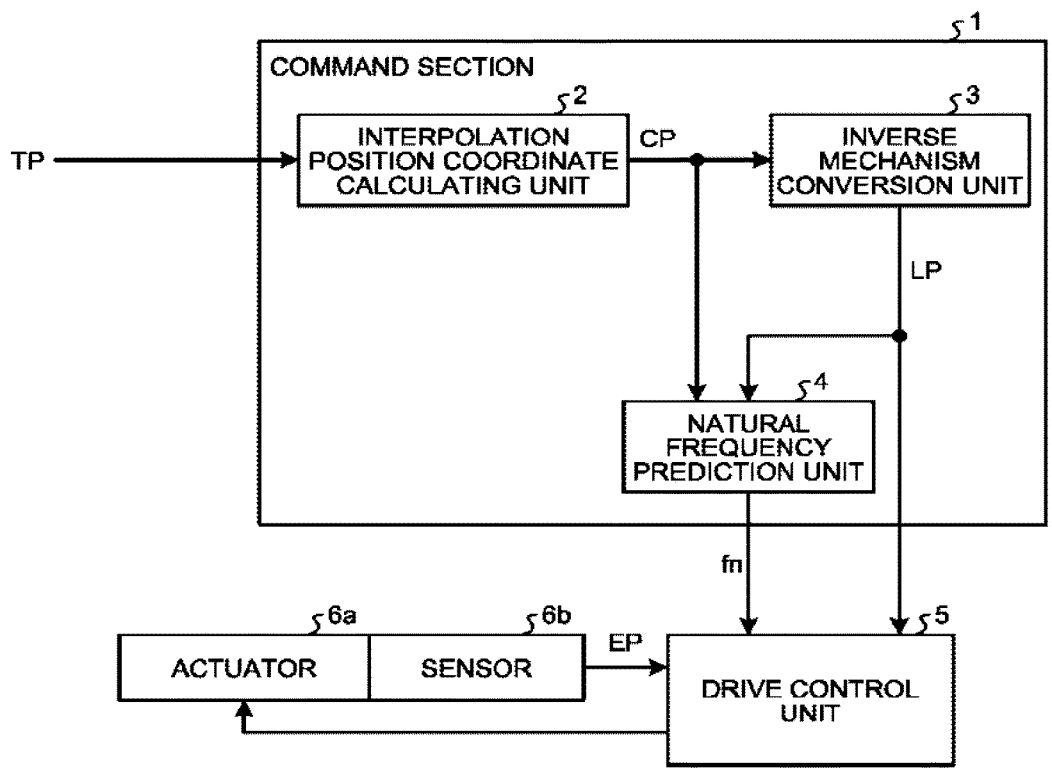
FIG. 1 is a block diagram illustrating a functional configuration of a controller for a parallel link mechanism according to a first embodiment.

FIG. 1 is a block diagram illustrating a functional configuration of a controller for a parallel link mechanism (hereinafter abbreviated as a "controller" as appropriate) according to a first embodiment. In FIG. 1, the controller according to the first embodiment includes: a drive control unit 5 that controls driving of a parallel link mechanism; and a command section 1 that gives a command, for controlling an actuator 6a, to the drive control unit 5.

As illustrated in FIG. 1, the command section 1 includes an interpolation position coordinate calculating unit 2 and an inverse mechanism conversion unit 3. The interpolation position coordinate calculating unit 2 calculates an interpolation position coordinate CP of a path of an end effector to a target position on the basis of the target position TP of the end effector. The inverse mechanism conversion unit 3 calculates a target position command LP for the actuator corresponding to each interpolation position coordinate CP of the end effector and outputs the command to the drive control unit 5. Note that the actuator is a generic name of a drive device that converts input energy into rotational motion or translational motion. The actuator includes a servo motor, a linear motor, or a stepping motor, for example.

The command section 1 further includes a natural frequency prediction unit 4 that calculates a natural frequency that changes depending on the position of the end effector. The natural frequency prediction unit 4 calculates a natural frequency fn corresponding to the interpolation position coordinate CP by using the interpolation position coordinate CP and the target position command LP corresponding to the interpolation position coordinate CP, and outputs the natural frequency to the drive control unit 5. The natural frequency prediction unit 4 calculates a predicted value of the natural frequency for each interpolation position of the end effector. Note that not only one but a plurality of predicted values may be calculated. The one predicted value or an aggregate of the plurality of predicted value data is called a "predicted value data string" or simply a "predicted value string".

The drive control unit 5 drives the actuator 6a according to the target position command LP. The amount by which the actuator 6a is driven is feedback controlled by an output from a sensor 6b that is a position sensor mounted on the actuator 6a. The sensor 6b detects a magnetic pole position of the actuator 6a. Information on the magnetic pole position of the actuator 6a is referred to as "motor position information" and expressed as "motor position information EP" where appropriate. The drive control unit 5 controls the actuator 6a according to the target position command LP. That is, the drive control unit 5 performs feedback control on the basis of the target position command LP and the motor position information EP. Under the control of the drive control unit 5, the end effector is controlled to be in desired position and attitude.

Figure 2:
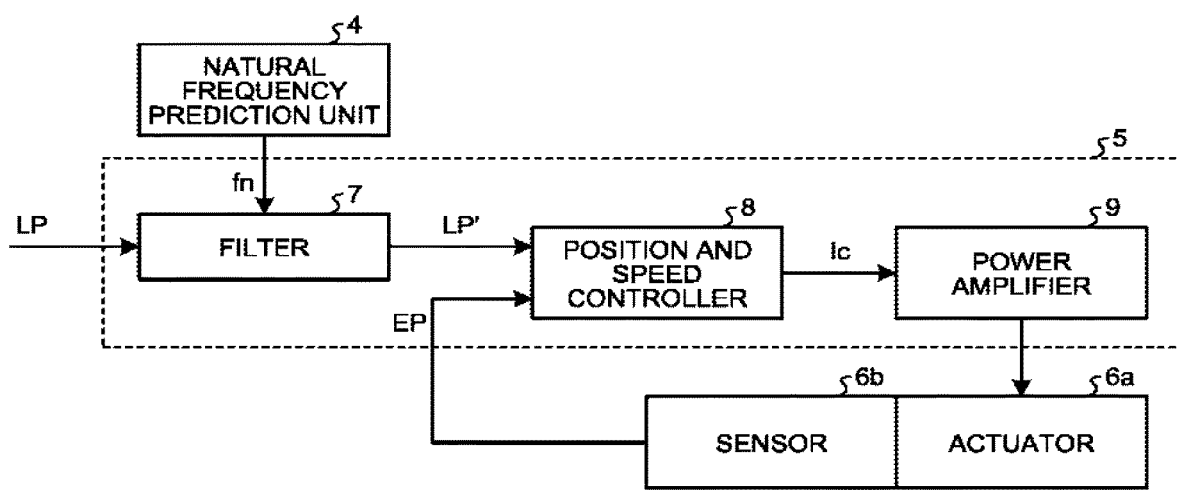
FIG. 2 is a block diagram illustrating a functional configuration of a servo system of a drive control unit according to the first embodiment.

Next, the configuration of a servo system in the drive control unit 5 of the first embodiment will be described with reference to FIG. 2. As illustrated in FIG. 2, the drive control unit 5 includes a filter 7, a position and speed controller 8, and a power amplifier 9.

The filter 7 receives: input of the target position command LP calculated by the inverse mechanism conversion unit 3; and the natural frequency fn predicted by the natural frequency prediction unit 4. The filter 7 suppresses a component of the natural frequency fn corresponding to an arbitrary interpolation position coordinate CP from the target position command LP corresponding to the interpolation position coordinate CP. This processing converts the target position command LP into a target position command LP'. Note that when the target position command LP and the target position command LP' are to be distinguished from each other without reference characters, the target position command LP is referred to as a "first target position command", and the target position command LP' is referred to as a "second target position command".

The position and speed controller 8 is a controller that controls the end effector to a target position. The position and speed controller 8 calculates a current command value Ic on the basis of: the target position command LP' generated by the filter 7; and the motor position information EP detected by the sensor 6b. The current command value Ic calculated by the position and speed controller 8 is output to the power amplifier 9. The power amplifier 9 drives the actuator 6a on the basis of the current command value Ic.

As in the servo system illustrated in FIG. 2, when the filter function for suppressing the component of the natural frequency fn is outside the feedback loop, the time required for the end effector to reach the target position may be increased by the conversion of the target position command LP into the target position command LP'.

Figure 3:
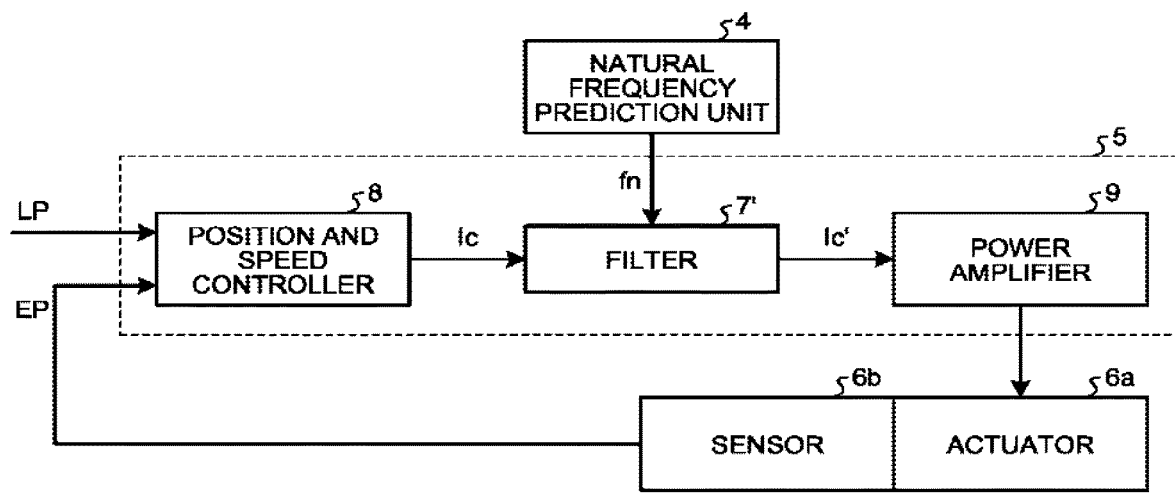
FIG. 3 is a block diagram illustrating a functional configuration of a servo system different from that in FIG. 2 of the drive control unit according to the first embodiment.

A servo system illustrated in FIG. 3 is configured by switching the filter 7 and the position and speed controller 8 in FIG. 2. As a result, a filter 7' is disposed in the feedback loop. The operation of the servo system illustrated in FIG. 3 will be described. The position and speed controller 8 calculates the current command value Ic on the basis of the target position command LP and the motor position information EP detected by the sensor 6b. The current command value Ic calculated by the position and speed controller 8 is output to the filter 7'. The filter 7' also receives input of the natural frequency fn predicted by the natural frequency prediction unit 4. The filter 7' suppresses the component of the natural frequency fn contained in the current command value Ic. This processing converts the current command value Ic into a current command value Ic'. Note that when the current command value Ic and the current command value Ic' are to be distinguished from each other without reference characters, the current command value Ic is referred to as a "first current command value", and the current command value Ic' is referred to as a "second current command value". The current command value Ic' generated by the filter 7' is output to the power amplifier 9. The power amplifier 9 drives the actuator 6a on the basis of the current command value Ic'.

As in the servo system illustrated in FIG. 3, when the filter function for suppressing the component of the natural frequency fn is inside the feedback loop, the target position command LP is not converted so that the time required for the end effector to reach the target position is not increased unlike the configuration in FIG. 2. However, a control system making up the servo system may become unstable depending on the natural frequency fn, whereby one may select between the configuration of FIG. 2 and the configuration of FIG. 3 depending on the natural frequency fn.

As described above, according to the controller of the first embodiment, the filter 7 or the filter 7' outputs the signal in which the frequency component corresponding to the natural frequency fn calculated by the natural frequency prediction unit 4 is suppressed. The filter 7 or the filter 7' changes the frequency component to be suppressed depending on the predicted value or the predicted value string of the natural frequency obtained for each interpolation position, whereby vibration that can occur in the parallel link mechanism can be suppressed.

The controller according to the first embodiment can suppress vibration that can occur in the parallel link mechanism by the action of the filter 7 or the filter 7', thereby being able to significantly reduce the man-hours for the adjustment of control parameters related to responsiveness in the position and speed controller 8. Depending on the application of the control system, the control parameters related to responsiveness may be constant without being changed depending on the position of the end effector.

Next, a method of predicting the natural frequency by the natural frequency prediction unit 4 will be described. First, a two-link rotary parallel link mechanism illustrated in FIG. 4 will be described as an example.

Figure 4:
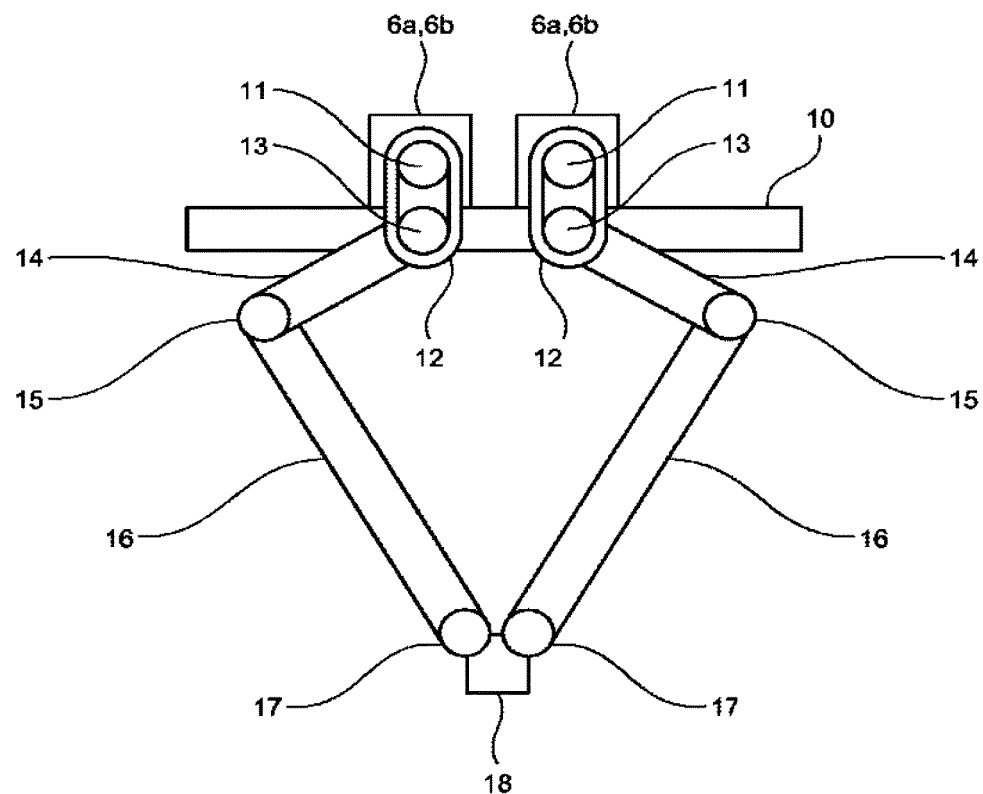
FIG. 4 is a schematic diagram of a two-link rotary parallel link mechanism.

The actuator 6a and the sensor 6b are installed to a base 10 as illustrated in FIG. 4. The actuator 6a rotationally drives an actuator shaft 11. The actuator shaft 11 rotationally drives a drive shaft 13 via a belt 12. As the drive shaft 13 is rotated, an upper link 14 directly connected to the drive shaft 13 is rotated. When the upper link 14 is driven, a lower link 16 connected via the upper link 14 and a link joint 15 is driven. When the lower link 16 is driven, an end effector 18 connected via the lower link 16 and an end effector joint 17 is ultimately driven.

Regarding the vibration problem of a typical parallel link mechanism, a predominant mode of vibration is a phenomenon in which a system from the link joint to the end effector having low rigidity vibrates as one like a pendulum. The present inventor has found this phenomenon by experiment.

Figure 5:
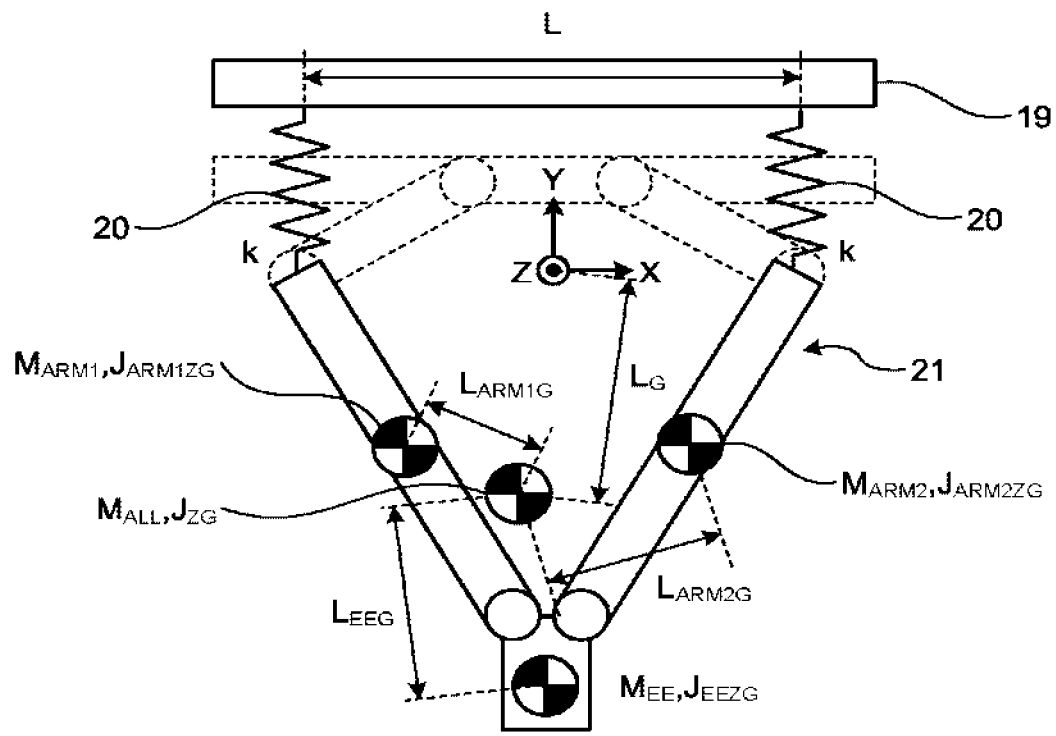
FIG. 5 is a diagram illustrating a dynamic model of the two-link rotary parallel link mechanism.

Now, a dynamic model illustrated in FIG. 5 is introduced for the two-link rotary parallel link mechanism. The dynamic model illustrated in FIG. 5 will now be described.

First, a virtual base 19 extending in a straight line connecting one of the link joint 15 to another one of the link joint 15 is assumed. Next, the link joint 15 is represented as a translational spring 20 orthogonal to the longitudinal direction of the virtual base 19. Then, the system from the link joint 15 to the end effector 18 is simulated as one rigid body 21.

According to the dynamic model, a mechanical part between the base 10 and the link joint 15 which is a joint closest to the base 10 is simulated by the virtual base 19 and the translational spring 20, and a mechanical part between the link joint 15 and the end effector 18 is simulated by the one rigid body 21. In other words, a system between the base 10 of the parallel link mechanism and the link joint 15 which is a joint connected to the base 10 of the parallel link mechanism is simulated by the translational spring 20, and a system between the joint and the end effector 18 is simulated by the one rigid body 21.

Next, a method of calculating the natural frequency by the dynamic model of FIG. 5 will be described. Note that in FIG. 5, an origin of coordinates is set at the midpoint between the two link joints, that is, the left link joint 15 and the right link joint 15. Moreover, an X axis is in the direction from the origin of coordinates to the right link joint 15, a Y axis is perpendicular to the X axis and is opposite in direction to the end effector 18, and a Z axis is defined to form a right handed system with the X axis and the Y axis.

The model of FIG. 5 includes a vibration mode in which the two translational springs 20 vibrate in phase to cause the rigid body 21 to translate in the Y direction in the drawing, and a vibration mode in which the two translational springs 20 vibrate in opposite phase to cause the rigid body 21 to undergo rotational vibration about the Z axis in the drawing. The vibration phenomenon at issue in the present application is the phenomenon in which the rigid body 21 vibrates like a pendulum. The description thus focuses on the rotational vibration mode while ignoring the translational motion.

First, the natural frequency fn of the rotational vibration mode can be calculated by the following expression (1) expressing the resonant frequency.

$$fn = (1/2\Pi) \times \sqrt{(K/J)} \quad (1)$$

In the above expression (1), "K" is a combined rotational spring constant about the Z axis by the two translational springs 20, and "J" is a moment of inertia about the Z axis of the rigid body 21 at the origin.

A relational expression between the combined rotational spring constant K and a translational spring constant k is expressed by the following expression (2).

$$K = (1/2) k \times L^2 \quad (2)$$

In expression (2), "L" is the distance between the link joints 15.

The moment of inertia J of the rigid body 21 can be calculated by the following expression (3) using the mass of the rigid body $M_{ALL}$, the moment of inertia $J_{ZG}$ about the Z axis at the center of gravity of the rigid body, and the distance $L_G$ from the origin of coordinates to the center of gravity of the rigid body.

$$J = J_{ZG} + M_{ALL} \times L_G^2 \quad (3)$$

The mass of the rigid body $M_{ALL}$ can be calculated by the following expression (4) as a sum of individual masses $M_{ARM1}$, $M_{ARM2}$, and $M_{EE}$ of the two lower links 16 and the end effector 18.

$$M_{ALL} = M_{ARM1} + M_{ARM2} + M_{EE} \quad (4)$$

The moment of inertia $J_{ZG}$ about the Z axis at the center of gravity of the rigid body can be calculated by the following expression (5) using: the masses $M_{ARM1}$, $M_{ARM2}$, and $M_{EE}$ as well as moments of inertia $J_{ARM1ZG}$, $J_{ARM2ZG}$, and $J_{EEZG}$ about the Z axis at the center of gravity of the rigid body of the two lower links 16 and the end effector 18; the distances $L_{ARM1G}$ and $L_{ARM2G}$ from the center of gravity of the rigid body to the individual centers of gravity of the two lower links 16; and the distance $L_{EEG}$ from the center of gravity of the rigid body to the center of gravity of the end effector.

$$J_{ZG} = J_{EEZG} + M_{EE} \times L_{EEG}^2 + J_{ARM1ZG} + M_{ARM1} \times L_{ARM1G}^2 + J_{ARM2ZG} + M_{ARM2} \times L_{ARM2G}^2 \quad (5)$$

Note that the distance $L_G$ from the origin of coordinates to the center of gravity of the rigid body and the distance from the center of gravity of the rigid body to each of the positions of the individual centers of gravity of the two lower links 16 can be calculated from the interpolation position coordinate CP of the end effector, the target position command LP of each actuator, and the mass values of the individual bodies.

Regarding the dynamic model described above, a trend of a change in a predicted frequency with respect to the position of the end effector will be described with reference to FIG. 6.

Figure 6:
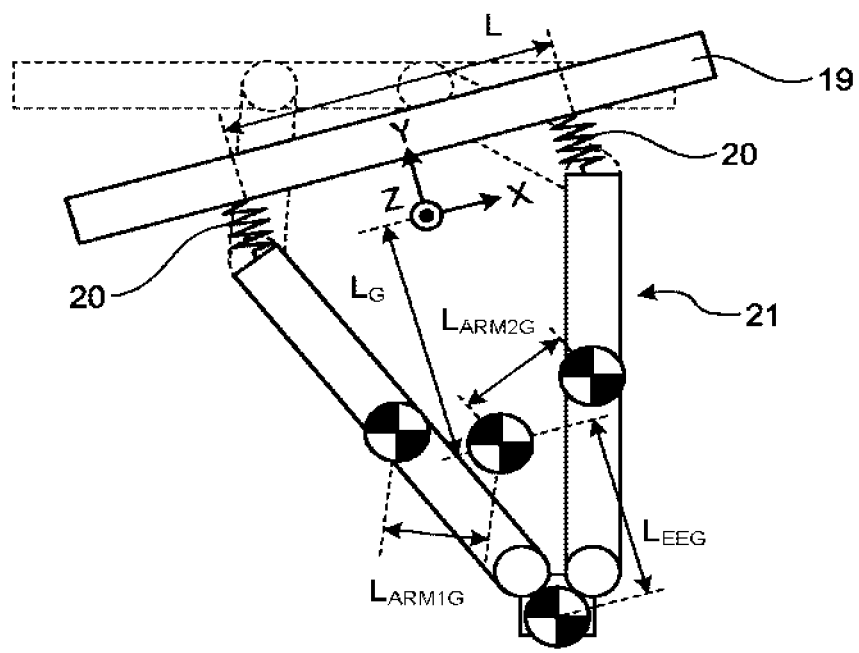
FIG. 6 is an explanatory diagram of a dynamic model when an end effector is away from an origin in the two-link rotary parallel link mechanism.

When the end effector is at a position away from the origin, as illustrated in FIG. 6, the position of the center of gravity of the rigid body 21 is far from the virtual base 19 to increase the value of the distance $L_G$ from the origin of coordinates to the center of gravity of the rigid body, whereby the value of the second term on the right side of expression (3) increases. As for the moment of inertia $J_{ZG}$ about the Z axis at the center of gravity of the rigid body in the first term on the right side of the expression, the distance between the center of gravity of the rigid body and the center of gravity of the end effector is increased to increase the value of the distance $L_{EEG}$. Moreover, in the parallel link mechanism, the mass of the end effector $M_{EE}$ is typically much larger than the masses of the lower links $M_{ARM1}$ and $M_{ARM2}$, so that the moment of inertia $J_{ZG}$ about the Z axis at the center of gravity of the rigid body increases as in expression (5). As a result, the value of the moment of inertia J of the rigid body 21 increases. Furthermore, when the end effector is at the position away from the origin, the value of the distance L between the link joints is decreased, so that the value of the combined rotational spring constant K calculated by expression (2) is decreased to decrease the natural frequency calculated by expression (1). Therefore, the natural frequency tends to be decreased when the position of the end effector is away from the origin.

Figure 7:
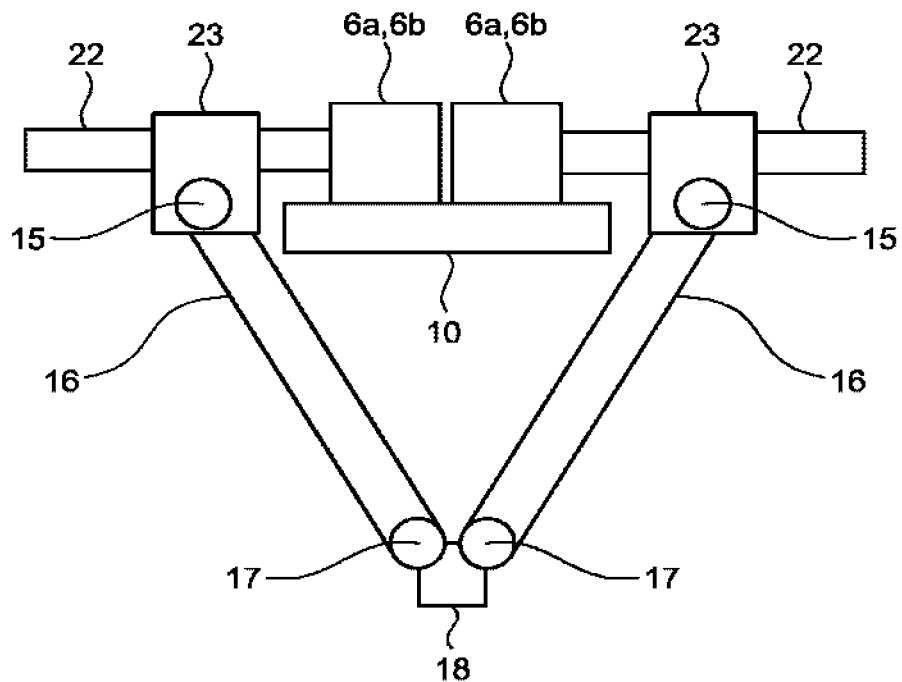
FIG. 7 is a schematic diagram of a two-link linear parallel link mechanism.

Next, the application to a parallel link mechanism having a different configuration will be described with reference to FIG. 7. FIG. 7 illustrates a two-link parallel link mechanism employing a linear motor.

The actuator 6a and the sensor 6b are installed to the base 10 as illustrated in FIG. 7. The actuator 6a drives a ball screw 22. A nut 23 is fitted to the ball screw 22. The lower link 16 is connected via the nut 23 and the link joint 15. The nut 23 moves linearly as the ball screw 22 rotates. When the nut 23 moves linearly, the lower link 16 and ultimately the end effector 18 connected via the lower link 16 and the end effector joint 17 are driven.

Figure 8:
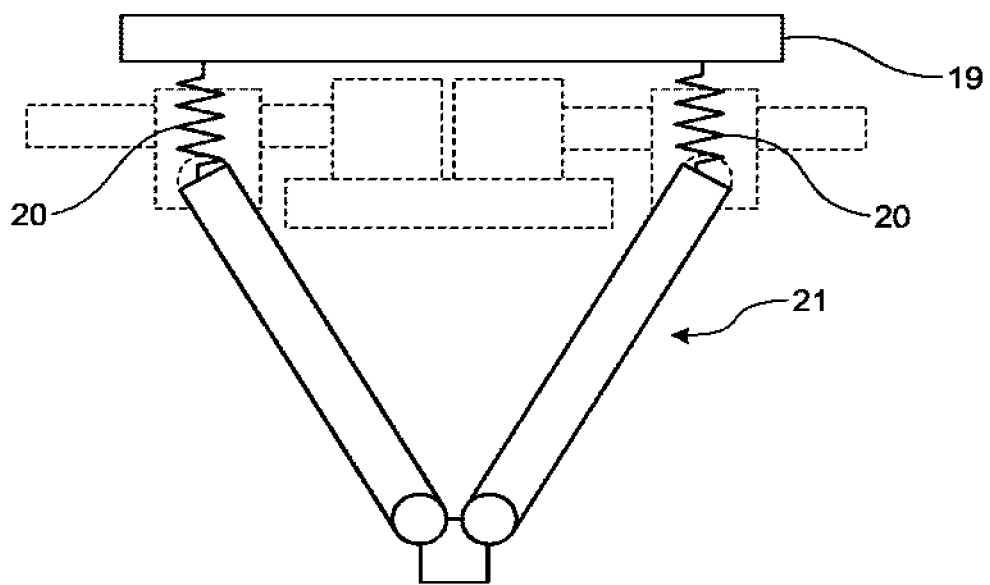
FIG. 8 is a diagram illustrating a dynamic model of the two-link linear parallel link mechanism.

A dynamic model illustrated in FIG. 8 is introduced for the two-link linear parallel link mechanism illustrated in FIG. 7. The dynamic model illustrated in FIG. 8 will now be described. First, the virtual base 19 extending in a straight line connecting the link joints 15 is assumed. Next, the link joint 15 is represented as a translational spring 20 orthogonal to the longitudinal direction of the virtual base 19. Then, the system from the link joint 15 to the end effector 18 is simulated as one rigid body 21.

When the end effector is at a position away from the origin, as in the parallel link mechanism of FIG. 4, the natural frequency fn is decreased due to the increase in the moment of inertia and the decrease in the distance between the link joints.

For a parallel link mechanism with three or more links, the combined rotational spring constant and the moment of inertia are calculated by a method different from that used in the parallel link mechanism of FIG. 4, but can be easily calculated by basic dynamics calculation. The tendency that the natural frequency fn is decreased when the end effector is at the position away from the origin is similar to the case of the two-link mechanism.

As for the modeling parameters, the mass value and the position of the center of gravity of each of the base, the link joint, the link, the end effector, the belt, the actuator, and the sensor may be a design value, an actual measured value, or an estimated value. Moreover, the translational spring constant k may be adjusted such that, for example, a predicted value of the frequency coincides with an actual measured value thereof at the end effector position where the frequency prediction accuracy is the most important, or may be adjusted such that an error between the predicted value of the frequency and the actual measured value thereof is minimized at a plurality of end effector positions.

As described above, the controller according to the first embodiment: simulates the mechanical system from the link joint to the end effector by one rigid body; constructs the dynamic model simulating the mechanical system between the base and the link joint of the parallel link mechanism by the translational spring; predicts the natural frequency that changes depending on the position of the end effector; and changes the frequency component to be suppressed for each interpolation position according to the predicted value string; thereby being able to suppress the vibration by the filter that suppresses the frequency calculated by the natural frequency prediction unit without changing the parameters of the control system related to responsiveness depending on the position of the end effector. This can achieve a heretofore unachieved, remarkable effect being the reduction in the number of control parameters requiring adjustment and thus the reduction in the man-hours for the adjustment of the parameters.

Second Embodiment

Figure 9:
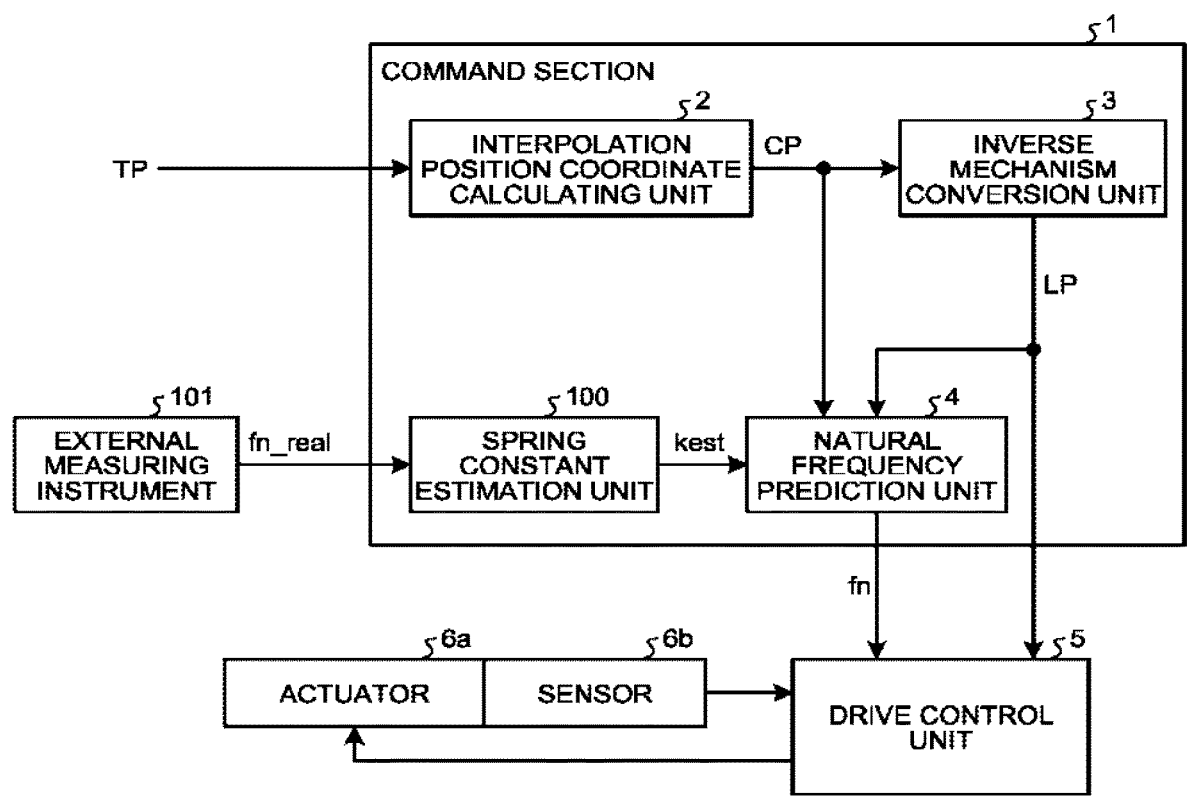
FIG. 9 is a block diagram illustrating a functional configuration of a controller for a parallel link mechanism according to a second embodiment.

A controller according to a second embodiment will now be described. FIG. 9 is a block diagram illustrating a functional configuration of a controller according to the second embodiment. The second embodiment includes a spring constant estimation unit 100 added to the command section 1 and an external measuring instrument 101 added outside the command section 1 in the configuration of the first embodiment illustrated in FIG. 1. A measured frequency fn_real measured by the external measuring instrument 101 is input to the spring constant estimation unit 100, and an estimated spring constant kest estimated by the spring constant estimation unit 100 is input to the natural frequency prediction unit 4. Note that the other configurations are identical or equivalent to those of the first embodiment illustrated in FIG. 1 and are thus denoted by the same reference numerals as those in FIG. 1, whereby a redundant description will be omitted. The measured frequency fn_real measured by the external measuring instrument 101 may be a signal obtained by converting the frequency of an acceleration signal obtained from an acceleration sensor mounted to the parallel link mechanism, or may be a signal obtained by converting the frequency of a position signal obtained from the sensor 6b.

Next, the main operation of the controller according to the second embodiment will be described. First, the spring constant estimation unit 100 estimates a spring constant in the dynamic model by using the following expression (6) obtained from the above expressions (1) and (2).

$$kest = J \times (2\Pi fn\_real)^2 / \{(L^2)/2\} \tag{6}$$

The estimated value of the spring constant obtained using the above expression (6) is called the estimated spring constant. The use of the estimated spring constant kest estimated by the spring constant estimation unit 100 in the natural frequency prediction unit 4 enables automatic estimation of the dynamic model and thus enables further reduction in the man-hours for the adjustment of the parameters.

Third Embodiment

Figure 10:
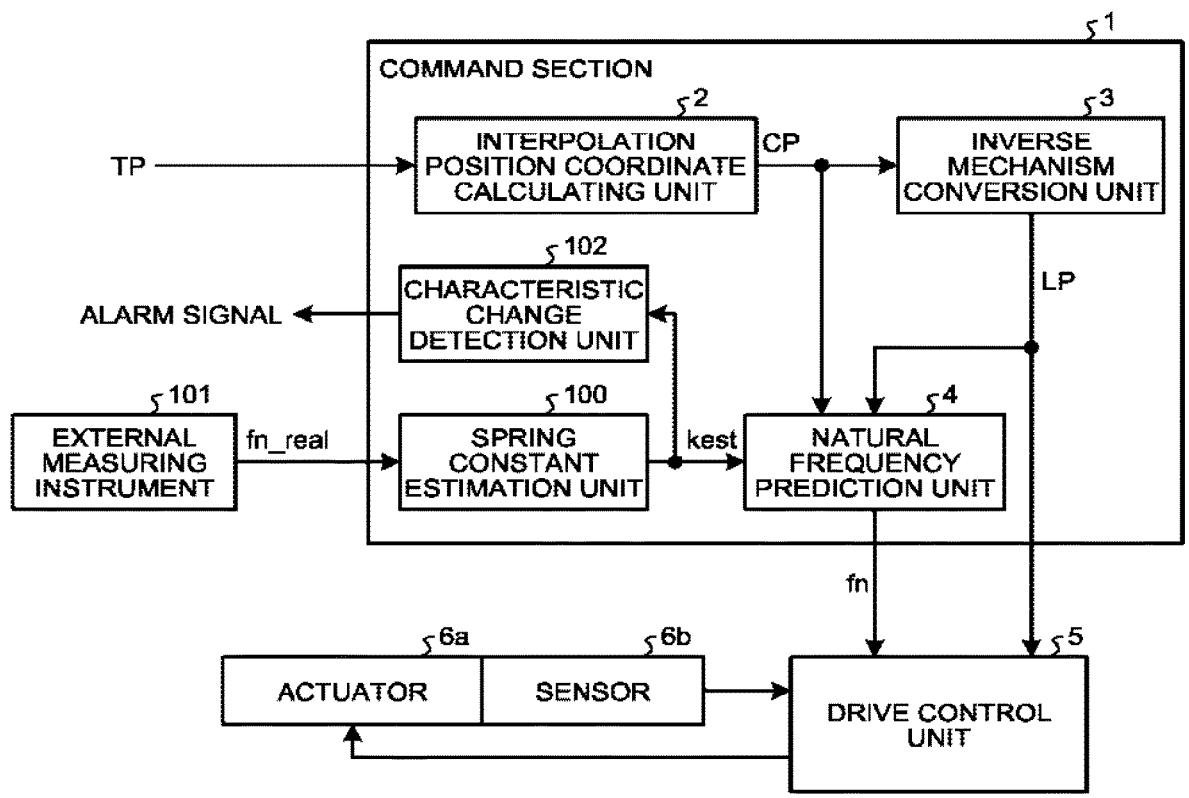
FIG. 10 is a block diagram illustrating a functional configuration of a controller for a parallel link mechanism according to a third embodiment.

A controller according to a third embodiment will now be described. FIG. 10 is a block diagram illustrating a functional configuration of a controller according to the third embodiment. The third embodiment includes a characteristic change detection unit 102 that is added to the command section 1 in the configuration of the second embodiment illustrated in FIG. 9. The characteristic change detection unit 102 is configured to output an alarm signal to the outside on the basis of the estimated spring constant kest estimated by the spring constant estimation unit 100. Note that the other configurations are identical or equivalent to those of the second embodiment illustrated in FIG. 9 and are thus denoted by the same reference numerals as those in FIG. 9, whereby a redundant description will be omitted.

Next, the main operation of the controller according to the third embodiment will be described. The characteristic change detection unit 102 monitors and stores the value of the estimated spring constant kest to determine that a system characteristic is changed and output the alarm signal when the estimated spring constant kest is changed significantly. As a result, maintenance work can be performed before the system breaks due to deterioration of the system.

Figure 11:
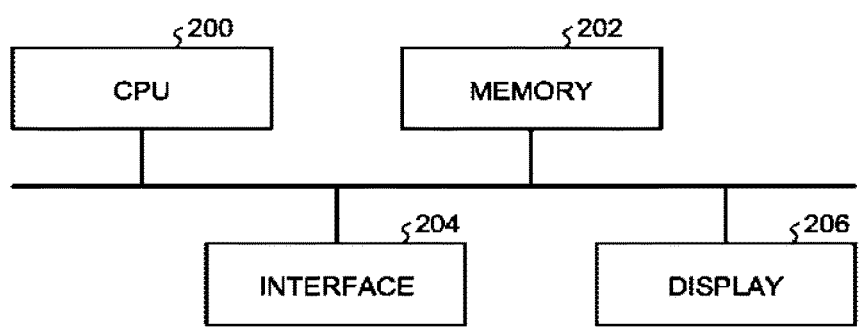
FIG. 11 is a block diagram illustrating an example of a hardware configuration for implementing functions of a command section according to the first to third embodiments.

Finally, a hardware configuration for implementing functions of the command section 1 according to the first to third embodiments will be described. When functions of the command section 1 according to the first to third embodiments are implemented in software, as illustrated in FIG. 11, the command section can include a central processing unit (CPU) 200 that performs calculation, a memory 202 that stores a program read by the CPU 200, and an interface 204 that inputs and outputs signals. The configuration of the third embodiment illustrated in FIG. 10 outputs the alarm signal when the characteristic change detection unit determines that the system characteristic is changed. Here, the alarm signal can be notified to a user, an administrator, or a designer when the command section 1 includes a display 206 as illustrated in FIG. 11.

Note that the CPU 200 may be one that is referred to as an arithmetic unit, a microprocessor, a microcomputer, a processor, or a digital signal processor (DSP). The memory 202 may be a non-volatile or volatile semiconductor memory such as a random access memory (RAM), a read only memory (ROM), a flash memory, an erasable programmable ROM (EPROM), or an electrically EPROM (EEPROM), a magnetic disk, a flexible disk, an optical disk, a compact disc, a mini disc, or a digital versatile disc (DVD).

The memory 202 stores a program for implementing the functions of the command section 1. The CPU 200 receives various kinds of information via the interface 204. The functions of the command section 1 are implemented by the CPU 200 executing the program stored in the memory 202. A result of processing by the CPU 200 may be displayed on the display 206.

The configuration illustrated in the aforementioned embodiment merely illustrates an example of the content of the present invention, and can thus be combined with another known technique or partially omitted and/or modified without departing from the scope of the present invention.

REFERENCE SIGNS LIST 1 command section; 2 interpolation position coordinate calculating unit; 3 inverse mechanism conversion unit; 4 natural frequency prediction unit; 5 drive control unit; 6a actuator; 6b sensor; 7 filter; 8 position and speed controller; 9 power amplifier; 10 base; 11 actuator shaft; 12 belt; 13 drive shaft; 14 upper link; 15 link joint; 16 lower link; 17 end effector joint; 18 end effector; 19 virtual base of dynamic model; 20 translational spring of dynamic model; 21 rigid body of dynamic model; 22 ball screw; 23 nut; 100 spring constant estimation unit; 101 external measuring instrument; 102 characteristic change detection unit; 200 CPU; 202 memory; 204 interface; 206 display.

The invention claimed is:
1. A controller for a parallel link mechanism comprising:
a drive controller to control an actuator that drives a parallel link mechanism; and
a command section to give a control command for the actuator to the drive controller, wherein
the command section includes a natural frequency predictor to calculate a predicted value string of a natural frequency of the parallel link mechanism calculated for each interpolation position of an end effector by using a dynamic model that simulates a mechanical system between a base and a link joint of the parallel link mechanism with a translational spring and simulates a mechanical system from the link joint to the end effector with one rigid body, and
the drive controller includes a filter to change a frequency component to be suppressed for each interpolation positions according to the predicted value string at each interpolation position of the end effector calculated by the natural frequency predictor.

2. The controller for a parallel link mechanism according to claim 1, wherein the filter
receives a first current command value output from a controller that controls the end effector to a target position, and outputs a second current command value to a power amplifier of the drive controller.

3. The controller for a parallel link mechanism according to claim 1, wherein the filter receives a first target position command as of a command signal to the drive controller, and outputs a second target position command to a controller that controls the end effector to a target position.

4. The controller for a parallel link mechanism according to claim 1, wherein the command section includes a spring constant estimator to estimate a spring constant from a measured frequency of the parallel link mechanism measured by an external measuring instrument.

5. The controller for a parallel link mechanism according to claim 4, wherein the command section includes a characteristic change detector to monitor an estimated value of the spring constant estimated by the spring constant estimator and output an alarm signal depending on a change in the estimated value.

6. The controller for a parallel link mechanism according to claim 2, wherein the command section includes a spring constant estimator to estimate a spring constant from a measured frequency of the parallel link mechanism measured by an external measuring instrument.

7. The controller for a parallel link mechanism according to claim 3, wherein the command section includes a spring constant estimator to estimate a spring constant from a measured frequency of the parallel link mechanism measured by an external measuring instrument.

8. The controller for a parallel link mechanism according to claim 6, wherein the command section includes a characteristic change detector to monitor an estimated value of the spring constant estimated by the spring constant estimator and output an alarm signal depending on a change in the estimated value.

9. The controller for a parallel link mechanism according to claim 7, wherein the command section includes a characteristic change detector to monitor an estimated value of the spring constant estimated by the spring constant estimator and output an alarm signal depending on a change in the estimated value.

* * * * *